Oct. 25, 1927.
J. B. MEEK ET AL
1,646,589
MITER BOX FOR POWER DRIVEN SAWS
Filed Dec. 4, 1924    3 Sheets-Sheet 1
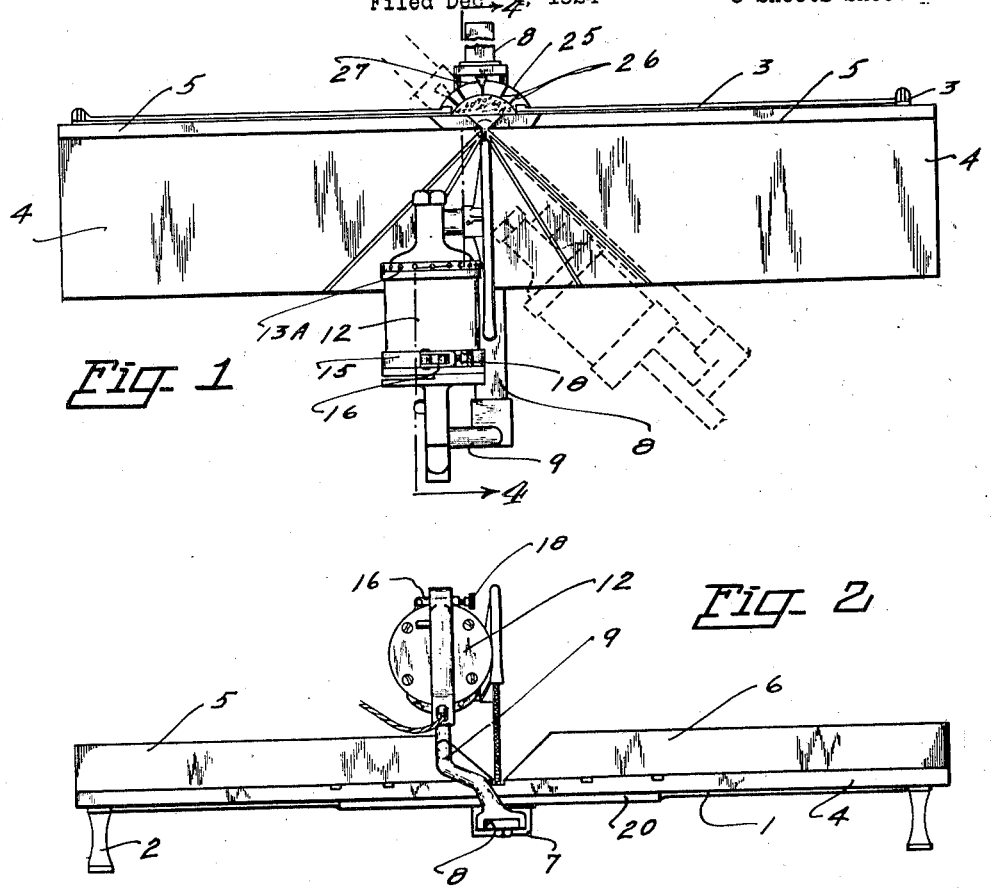
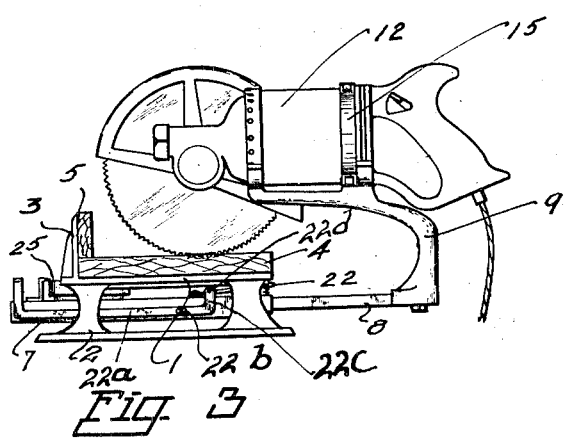
Inventors
John B. Meek
Cecil F. Hayse
Attorney Oct. 25, 1927.  
J. B. MEEK ET AL  
1,646,589  
MITER BOX FOR POWER DRIVEN SAWS  
Filed Dec. 4, 1924   3 Sheets-Sheet 2
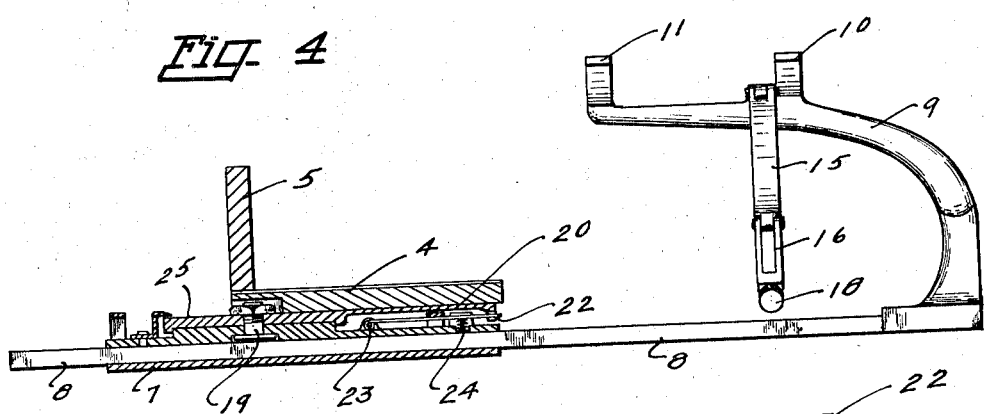
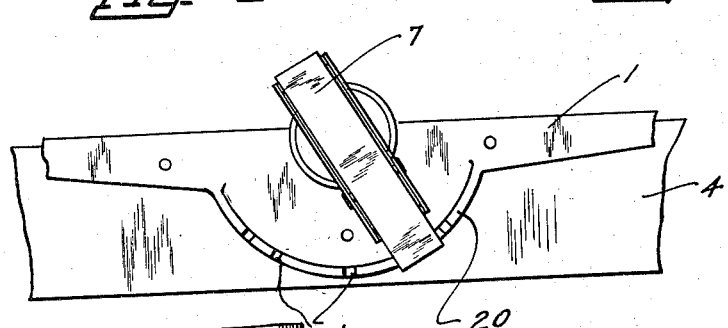
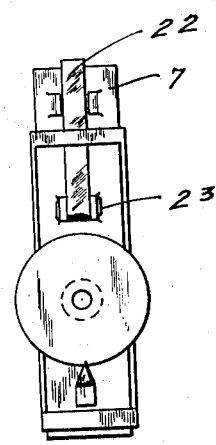
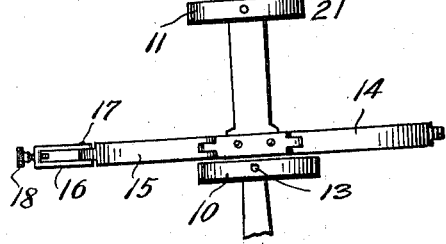
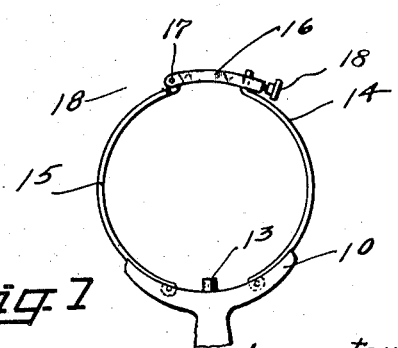
Inventor  
John B. Meek  
Cecil F. Hayse  
Attorney Oct. 25, 1927.
J. B. MEEK ET AL
1,646,589
MITER BOX FOR POWER DRIVEN SAWS
Filed Dec. 4, 1924   3 Sheets-Sheet 3
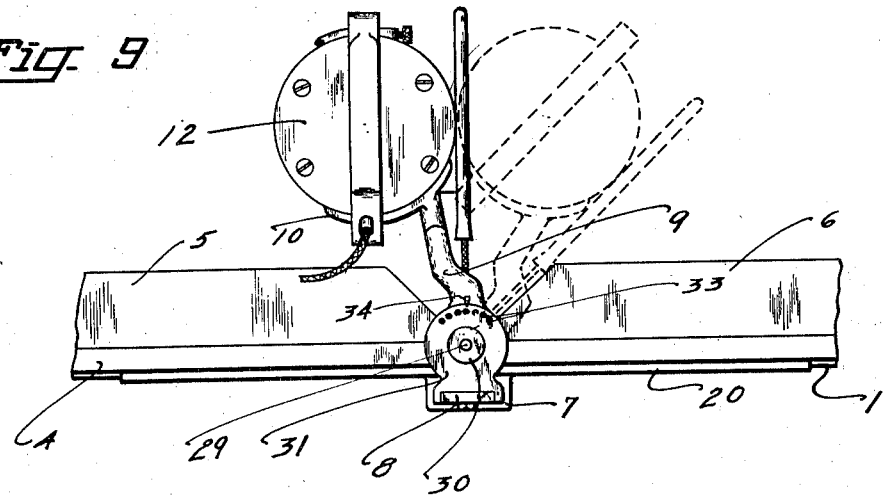
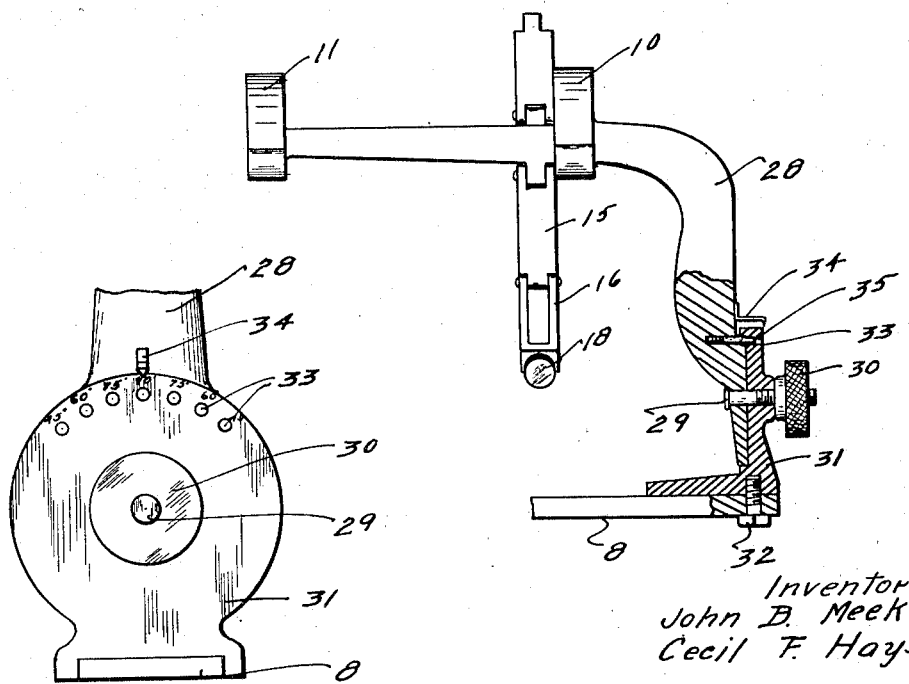
Inventors
John B. Meek
Cecil F. Hayse
Attorney Patented Oct. 25, 1927.

1,646,589

UNITED STATES PATENT OFFICE.

JOHN B. MEEK AND CECIL F. HAYSE, OF PORTLAND, OREGON.

MITER BOX FOR POWER-DRIVEN SAWS.

Application filed December 4, 1924. Serial No. 753,874.

Our invention relates to improvements in miter boxes for power driven saws and the like and consist primarily of a frame member having attached thereto a back and bottom member adapted to the placing of materials thereon to be sawed by the power driven saw.

Other objects consist in a frame support for the power driven unit adapted to being manipulated across the frame structure in guide-ways adapted to maintain the saw in absolute alignment.

Further objects consist in a vertical trunnion about which the power unit holding means may be rotated to cut the different angular cuts required in mechanical work.

Further objects consist in a graduated head adapted to register in degrees or other units the amount of angular movement of the trunnion power driven unit about the vertical center about which it is to be rotated.

Further objects reside in the means of rotating the power driven unit about a horizontal point to facilitate the making of the necessary inclinational, or hopper cuts required to be made in mechanical work.

Further objects reside in a graduated means for determining the amount of rotation of the power driven unit about the horizontal pivotal point.

Further objects reside in the locking means for locating and locking the units to be rotated about their respective vertical and horizontal point of rotation.

Additional objects consist in the means of attaching the power unit to the supporting member for the same.

Additional objects consist in the clamping means for holding the work in position during the process of cutting.

Still further and novel objects consist in the removable base and back adapted to being replaced when the same is worn or becomes damaged from continued use.

With these and incidental objects in view the invention consists in certain novel features of construction and combinations of parts, the essential elements of which are set forth in the appended claims and the preferred form of embodiment of which is hereinafter shown with reference to the drawings which accompany and form a part of this specification.

In the drawings:

Fig. 1, is a plan assembly view of our invention.

Fig. 2, is a front side elevation of the mechanism shown in Fig. 1.

Fig. 3, is an end elevation of the mechanism shown in Fig. 1.

Fig. 4 is a sectional view taken on line 4—4 of Fig. 1 looking in the direction indicated. In this view the power unit is shown detached and removed.

Fig. 5 is a fragmentary plan view of the guide support and trunnion mechanism looking upward from beneath the unit.

Fig. 6 is a plan view of the trunnion and guide mechanism shown removed from the device.

Fig. 7 is an end view of the clamping means for the power driven unit and shows a part of the bracket support for the power unit.

Fig. 8 is a plan view of the mechanism shown in Fig. 7 with the clamping means shown distended for the admission of the power unit therein.

Fig. 9 is a forward front elevation of the assembled machine showing the locating and locking means for the rotation of the power unit adapted to the making of hopper cuts. The dotted position shows the same in position for making a hopper cut.

Fig. 10 is a side elevation of the clamping means for the power unit shown partially in section to illustrate the locating and locking means.

Fig. 11 is a fragmentary front elevation of the locating and locking means for the horizontal rotation.

Like reference characters refer to like parts throughout the several views.

1 is the base of the frame structure having leg support 2 attached thereto and having the back number 3. This frame structure is made of rigid material such as cast-iron and has a removable base 4 and a removable back 5 adapted to replacement when worn or damaged. The removable back portion is preferably made in two parts as shown at 5 and 6 to facilitate the passage of the saw thereacross.

Mounted below the base is a guide-way 7 adapted to the passage of a supporting slide 8 therethrough to which is attached a bracket 9 having a suitable cradle like member 10 at the upper part thereof which may be made in two parts as at 10 and 11 to facilitate the placing of the frame of the power unit 12 therein and to hold the same in alignment. About the outer periphery of the frame of the power unit are engaging holes adapted to receive the lug 13 therein which locates and maintains the power unit in fixed placement.

To maintain the power unit, in fixed position, about the lug, we have provided clamps 14 and 15 hinged within the cradle and adapted to being connected together at the top portion by a suitably hinged screw adjusted member 16. The hinged member is rotated about the pin 17 in the clamp 14 and adapted to engagement with the opposite clamp 15 through the action of the hand screw 18 whereby a snug positive contact is created between the clamping means and the frame of the power unit, to maintain the same in position. The guide-way 7 is adapted to being located about a pivotal center pin 19. The base 1 of the frame has a quadrant 20 with notches 21 adapted to receive the locking bar 22 therein; the locking bar 22 is hinged about a pin 23 and is held in position for engagement with the notches in the quadrant by means of the compression spring 24. To facilitate the engagement and the disengagement of the locking bar from the notches in the quadrant a locking lever 22ª best shown in Fig. 3 is journaled about pin 22ᵇ and has an upturned bell crank 22ᶜ which is adapted to engagement with the locking bar 22 by the pin connection 22ᵈ, a depression of the locking lever 22ª disengages the locking bar by depressing the same from the notches of the quadrant. The base has a rounded section, midway its back, as shown at 25, having graduation marks thereupon as shown at 26 to indicate the degrees of movement, either side of a right angle to the back; a swinging guide-way has mounted thereupon a graduated indicator. The notches in the quadrant correspond to the degrees marked upon the graduations so that the operator may determine the amount of movement about the vertical axis, by inspection of the pointer in its relation with the quadrant.

When the operator desires to make hopper, or inclinational cuts, the bracket 9 is removed from the slide 8 and bracket 28 is substituted therefor having a cradle like receptacle for the reception of the power unit therein. The bracket 28 is pivoted about a horizontal holding threaded journal 29 having a knurled hand nut 30 adapted thereto. The tightening of the hand screw nut upon the threaded pin creates a tight relationship between the bracket and the cradle supporting arm. The base bracket 31 is secured to the slide 8 by means of set-screw 32. The bracket 31 has graduated holes 33 so located as to represent degrees of rotation of the cradle support about the horizontal journal and the bracket carries a pointer 34 adapted to being spotted directly above the graduated holes 33. A pointer 35 projecting from the bracket 28 is adapted to engagement within the graduated holes 33 and locates the bracket in angular position for making hopper cuts as illustrated in the dotted position of Fig. 9.

The power unit here illustrated is that of an electric driven circular saw which is a portable unit when removed from the bracket and may be used independently of the miter box herein shown.

While the form of mechanism herein shown and described is admirably adapted to fulfill the base primarily stated, it is to be understod that it is not intended to confine the invention to the one form of embodiment herein shown and described, as it is susceptible of embodiment in various forms, all coming within the scope of the claims which follow.

We claim:

1. The combination of a miter box and power driven saw, comprising a structural frame disposed upon leg supports, a removable base and back mounted on the structural frame, a guideway journaled about a vertical pivotal center disposed beneath the structural frame, a supporting slide fitted to the guideway, a base bracket mounted on the upper side of the forward end of the slide, a cradle bracket pivotally secured to said base bracket, a power driven saw mounted on said cradle bracket, and graduated means disposed below and upon the structural frame permitting the locating and locking of the guideway in a fixed position when manipulated about its vertical pivotal center.

2. The combination of a miter box and power driven saw, comprising a structural frame, a removable base and back for said frame, a guideway journaled about a vertical axis disposed within the structural frame, a slide disposed within the guideway, a base bracket mounted at the forward end of said slide, a bracket pivotally mounted on the base bracket, cradles disposed upon said pivotally mounted bracket, hinged clamps mounted to said bracket adjacent one of said cradles, a power driven saw removably secured within said cradles by said clamps, and means to secure the guideway in a fixed position when rotated about its vertical axis.

3. The combination of a miter box and power driven saw, comprising a structural frame mounted upon leg supports, a removable base and back disposed upon the upper surface of the frame, a guideway journaled about a vertical axis disposed below the structural frame, a slide maintained within the guideway, a base bracket detachably mounted on the forward end of the slide, a graduated quadrant upon the base bracket, a horizontal journal within the graduated quadrant, a cradle bracket pivotally mounted in said horizontal journal, cradles adapted to support a power saw in fixed position, disposed upon the cradle bracket, a power saw mounted in said cradles, and means to secure the cradle bracket in a fixed position on said horizontal journal.

JOHN B. MEEK.
CECIL F. HAYSE.